Feb. 8, 1944.　　　　　G. FAULDS　　　　2,341,317
ANTISKID DEVICE
Filed Nov. 12, 1941　　　3 Sheets-Sheet 1
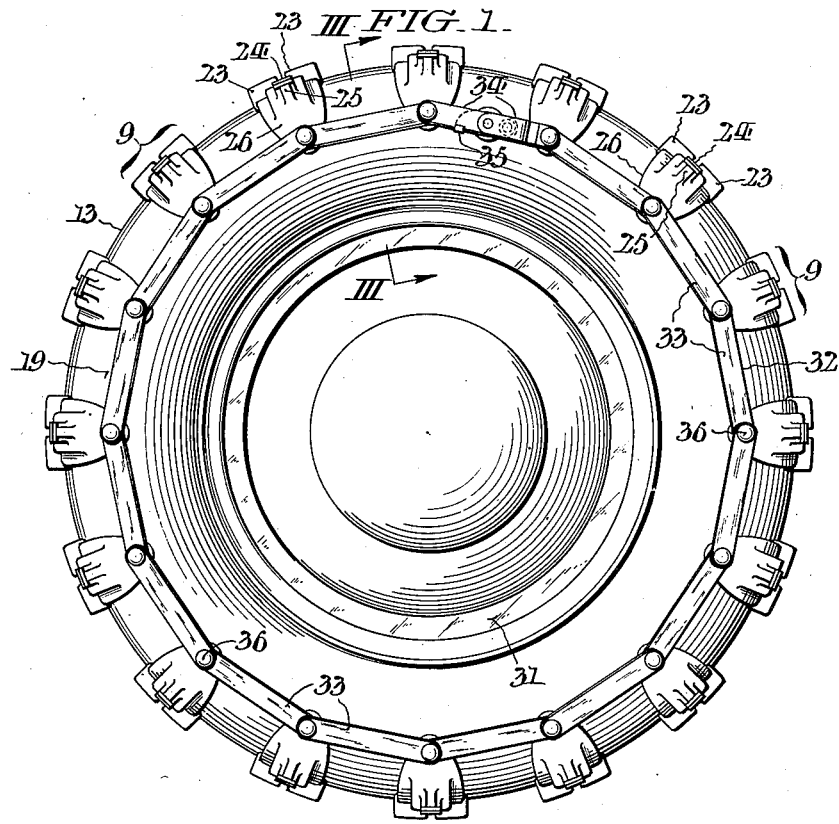
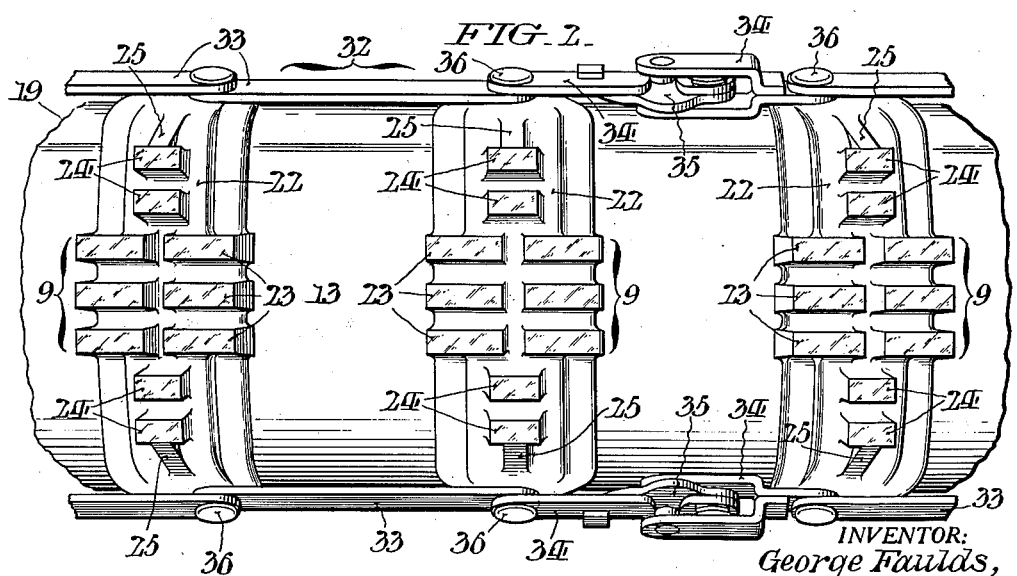
INVENTOR:
George Faulds,
BY Paul & Paul
ATTORNEYS.

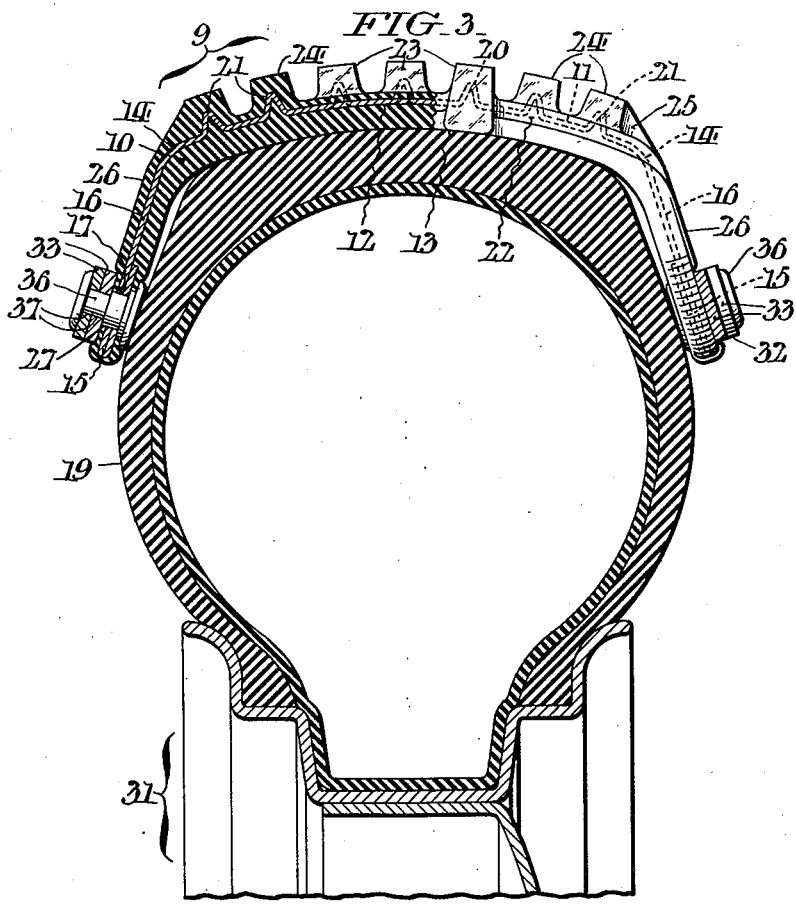
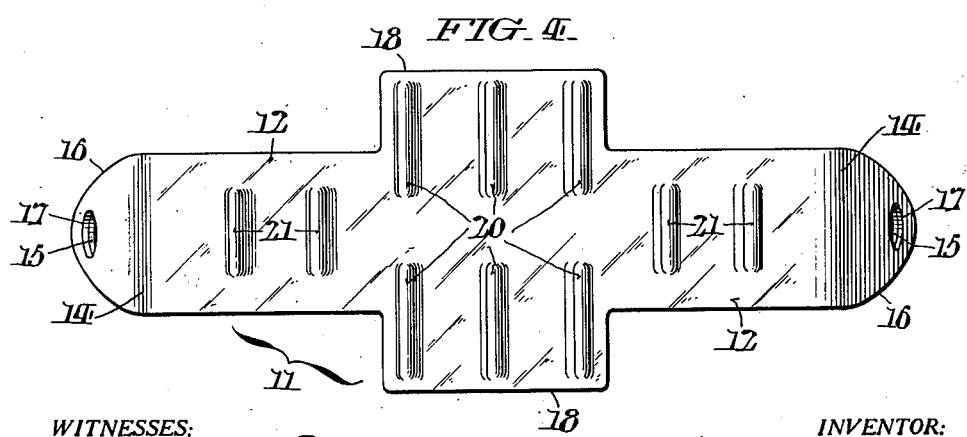

Feb. 8, 1944. G. FAULDS 2,341,317
ANTISKID DEVICE
Filed Nov. 12, 1941 3 Sheets-Sheet 3
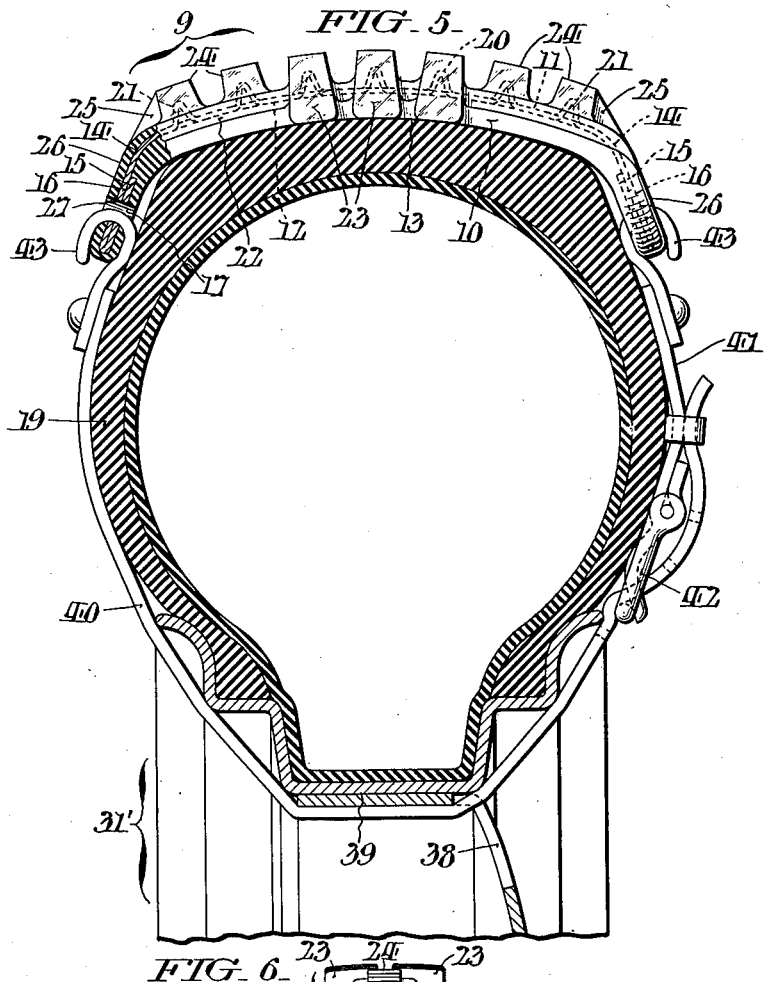
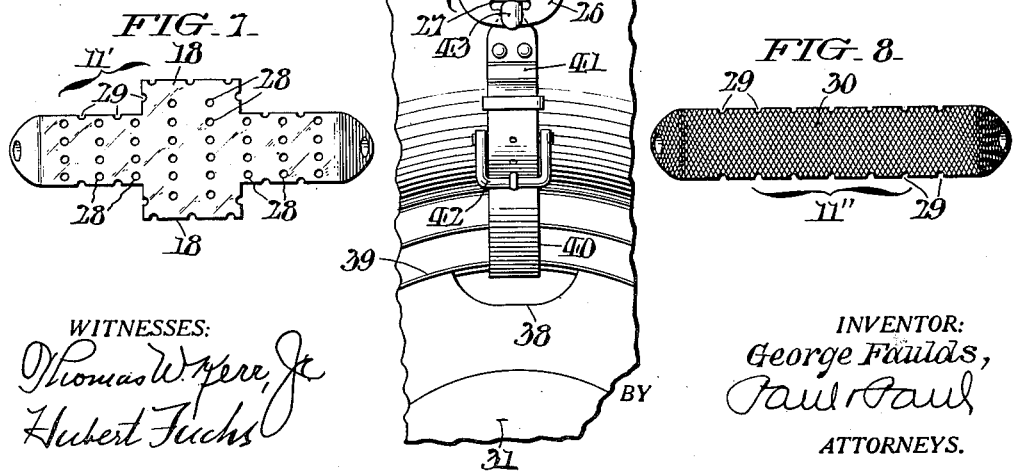
INVENTOR:
George Faulds,
BY
ATTORNEYS.

Patented Feb. 8, 1944

2,341,317

UNITED STATES PATENT OFFICE 2,341,317

ANTISKID DEVICE

George Faulds, Philadelphia, Pa.

Application November 12, 1941, Serial No. 418,679

2 Claims. (Cl. 152—222)

This invention has general reference to certain new and useful improvements in devices for protecting vehicle tires and, more particularly, relates to the species primarily designed to prevent skidding. Known devices of the latter species are of diverse forms and among others have comprised a suitably shaped road-gripping shoe bowed across the vehicle tire and having articulated or other means for securing the same in circumferentially spaced relation about the vehicle wheel.

The primary aim of the present invention is to furnish an improved traction element or antiskid device which is preferably reinforced by a novel sheet metal element designed to not only strengthen and increase the life of the device, but which also enables attachment thereof to be easily effected, either in comparatively close proximity or widely separated relation around a vehicle tire.

Another aim of this invention is the provision of an anti-skid device of the type indicated by the preceding paragraph, in which the reinforcing element is better anchored against displacement, and one that can be easily articulated in spacial sequence or individually attached to, or about, a vehicle wheel.

Other objects, with ancillary advantages, of this invention will be better understood by reference to the accompanying three sheets of drawings illustrative of preferred embodiments thereof, and which will now be described, it being understood that changes may be made in the structural details and arrangement of the constituent parts, without departing from the spirit and scope of said invention as more definitely expressed in the concluding claims.

In the drawings:

Fig. 1 is a side view of a standard type automobile wheel having one embodiment of the present invention applied around and secured to a vehicle wheel tire.

Fig. 2 is a fragmentary plan view of the outer circumferential or tread surface of the wheel, shown by Fig. 1, but drawn to larger scale for better illustration of the details.

Fig. 3 is a cross-section taken as indicated by the angle-arrows III—III in Fig. 1.

Fig. 4 is a top plan view of a reinforcing element incorporated in each anti-skid unit illustrated by the preceding three figures.

Fig. 5 is a similar cross-section to Fig. 3 illustrating a modified form of the invention as adapted for application around a tire tread and securement to the rim of the wheel.

Fig. 6 is a fragmentary side view of the preceding illustration as viewed from the right-hand thereof or looking towards the left-hand.

Fig. 7 is a plan view of a modified type of the reinforcing element shown by Fig. 4; and, Fig. 8 is a similar view of a further embodiment of said element.

In describing the forms of this invention exemplified by the drawings herewith, specific terms will be employed for the sake of clarity; but it is to be understood the scope of said invention is not thereby limited, each such term being intended to embrace all equivalents which perform the same function for an analogous purpose.

The anti-skid unit or device constituting the fundamental of this invention is comprehensively designated in the drawings by the reference numeral 9; and referring first to Figs. 1–5 more particularly, said device preferably consists of a suitably formed resilient body 10, with a sheet metal reinforcement 11. This reinforcement 11, see Fig. 4 to best advantage, conveniently, although not essentially, is made of sheet metal to include an arcual base part 12, for disposition cross-wise of the tire tread 13, having the respective end sections rounded at 14 and retroverted at 15 to define tire flanking portions 16, appropriately provided with apertures 17 therethrough, for a purpose later on set forth. Each reinforcement 11 is also formed with medially located opposing sections 18 which are circumferentially directed relative to the vehicle tire 19; and, in addition thereto, said reinforcement embodies outwardly-expanded inverted V-section spaced hollow projections 20, 21.

A reinforcement 11 is appropriately included or incorporated in a durable rubber or other suitable resilient body 10, and it will be readily understood from Figs. 2 and 3, more particularly, that the arcual part 12 of the reinforcement 11 is embedded in the thickened part 22 of said resilient body with the expanded V-sections 20, 21 similarly located in the traction projections or ribs 23, 24 thereof. Thus it will be readily understood that not only is the thickened rubber part 22 of the resilient body 10 substantially reinforced, but also that the laterally-spaced circumferentially-directed series of traction ribs 23, 24, with which the device 9 is provided, are somewhat rigidified and strengthened against distortion or disruption, whereby the life of said device is obviously enhanced and its anti-skid durability materially increased. It is also to be observed that the outermost of each of the side ribs 24 is centrally braced by a fillet strut 25, while the rubber flanking portions 26 are provided with holes 27 in registration with the reinforcement apertures 17.

Fig. 7 shows a type of sheet metal reinforcement 11' of corresponding general contour to that previously described, which is devoid of the expanded projections 20, 21, but provided with internal perforations 28 and edge notchings 29, preferably of corresponding semi-size, whereby said reinforcement is effectively anchored in the rubber body 10; whereas Fig. 8 shows a reinforcement 11'' without the circumferentially-directed medial sections 18, but having both plane surfaces roughened, as indicated by the diagonally intersecting lines 30 and with edge notchings 29.

In applying individual unit devices 9 to the type of disc wheel 31 shown by Figs. 1–3, in the manner of an endless anti-skid means, use is conveniently made of a chain 32, the respective links 33 whereof are of a length to define the spacial relationship of said devices. This chain 32 has opposing side links made in half-sections 34, Figs. 1 and 2, for connection in assembly by pivotal snap dogs 35, in a manner well understood by those conversant with tire chains. The several links 33 are pivotally connected together, at their respective ends, and to the anti-skid devices 9 by appropriate coupler studs 36, engaged through the device apertures 17 and registering holes 27, as well as holes 37 provided for the purpose in the link lapping ends; all as readily appreciated upon examination of the drawings. On the other hand, where it is desirable to employ only individual unit devices 9, as in the case of spoke wheels; or a disc wheel 31', Figs. 5 and 6, having spaced cut-outs 38, adjoining the inner underside of the rim 39, recourse is had to aligned flexible straps 40, 41, provided with an adjuster buckle 42, and fitted at their free ends with appropriate hooks 43 for engagement outwardly through the unit flanking portion holes 17, 27, in a manner clearly apparent without further elaboration herein.

From the foregoing the merits and advantages of the hereinbefore explained invention will be fully understood, while it is to be noted the anti-skid units or devices 9 are susceptible of manufacture from differing materials, other than durable rubber and sheet metal, for particular service condition, without departing from the spirit and scope of said invention.

Having thus described my invention, I claim:

1. The combination in an anti-skid device of the type described, of a sheet-metal reinforcement comprising an imperforate main arcual section with extensions shaped to define tire flanking portions each having the terminal part apertured for anchorage purposes, said arcual section also embodying medially-located opposing lug-sections; and medially-located, as well as relatively staggered, outwardly-expanded series of hollow-projections from the arcual section of said reinforcement, for the purpose specified.

2. The combination as defined in claim 1, wherein the sheet-metal reinforcement has the terminal parts retroverted and apertured, and the hollow-projections are of inverted V-shape cross-section.

GEORGE FAULDS.